United States Patent [19]
Momose et al.

[11] Patent Number: 5,659,219
[45] Date of Patent: Aug. 19, 1997

[54] POLYPHASE STATOR AND METHOD OF PRODUCING SAME

[75] Inventors: Tomoaki Momose; Shin Ogawa, both of Sayama, Japan

[73] Assignee: Honda Giken Kogyo Kabushiki Kaisha, Tokyo, Japan

[21] Appl. No.: 430,865

[22] Filed: Apr. 28, 1995

[30] Foreign Application Priority Data

Apr. 28, 1994  [JP]  Japan .................................. 6-091676

[51] Int. Cl.⁶ ............................. H02K 3/46; H02K 15/00
[52] U.S. Cl. .................................... 310/260; 29/596
[58] Field of Search ........................... 310/260, 270, 310/43, 42, 208, 201, 179; 29/596, 605, 606, 598

[56] References Cited

U.S. PATENT DOCUMENTS

| | | | |
|---|---|---|---|
| 3,445,706 | 5/1969 | Drabik | 310/270 |
| 3,575,623 | 4/1971 | Stine | 310/260 |
| 3,663,272 | 5/1972 | Benke | 29/602 |
| 3,820,483 | 6/1974 | Herl et al. | 112/121.2 |
| 4,163,912 | 8/1979 | Gottung et al. | 310/45 |
| 4,293,784 | 10/1981 | Zdaniewski et al. | 310/45 |
| 4,307,311 | 12/1981 | Grozinger | 242/1 |
| 4,328,438 | 5/1982 | Zolman | 310/68 R |
| 4,399,949 | 8/1983 | Penn et al. | 310/184 |
| 4,588,916 | 5/1986 | Lis | 310/260 |
| 4,752,707 | 6/1988 | Morrill | 310/179 |

FOREIGN PATENT DOCUMENTS

1195398  7/1966  United Kingdom .

*Primary Examiner*—Steven L. Stephan
*Assistant Examiner*—Michael J. Wallace, Jr.
*Attorney, Agent, or Firm*—Birch, Stewart Kolasch & Birch, LLP

[57] ABSTRACT

A sheet of insulating paper has flat portions inserted between windings that are arranged radially of a stator core, and bent portions extending and bent back radially of the stator core and inserted between windings that are arranged circumferentially of the stator core, the bent portions being positioned between and integral with the flat portions.

6 Claims, 7 Drawing Sheets

POLYPHASE STATOR AND METHOD OF PRODUCING SAME

BACKGROUND OF THE INVENTION

1. Field of the Invention

The present invention relates to a polyphase stator having insulating members interposed between the coil ends of polyphase windings disposed in slots in a stator core, and a method of producing such a polyphase stator.

2. Description of the Related Art

Generally, electric motors comprise a stator core having as many windings as the number of phases and a rotor having a plurality of permanent magnets on its outer circumferential surface and positioned rotatably in the stator core. The stator core is composed of a stack of steel sheets joined integrally together, and has a plurality of slots defined in its inner circumferential surface. The windings are disposed in the slots of the stator core.

The windings comprise insulated conductive wires, e.g., coils of enameled wire, and are inserted in the slots with sheets of insulating paper (insulating members) disposed between the coil ends of the windings to electrically insulate the windings. Each of the sheets of insulating paper is usually of a planar shape rolled and brought into position each time one phase of winding is inserted into the stator core.

Since the sheets of insulating paper are planar, however, they cannot be held between the windings if the gaps between the windings are increased. Therefore, the sheets of insulating paper tend to be removed from between the windings or displaced out of position, failing to keep the windings effectively insulated.

SUMMARY OF THE INVENTION

It is therefore an object of the present invention to provide a polyphase stator which allows insulating members to be disposed reliably between polyphase windings and keeps the polyphase windings highly insulated effectively with a simple structure, and a method of producing such a polyphase stator.

To achieve the above object, there is provided in accordance with the present invention a polyphase stator comprising a stator core having slots, polyphase windings disposed in the slots of the stator core and having respective coil ends, and insulating members disposed between the coil ends of the polyphase windings, each of the insulating members comprising a flat portion extending circumferentially of the stator core and inserted between adjacent two of the polyphase windings which are arranged radially of the stator core, and a bent portion extending and bent back radially of the stator core and inserted between adjacent two of the polyphase windings which are arranged circumferentially of the stator core, the bent portion being integral with the flat portion.

According to the present invention, there is also provided a method of producing a stator core, comprising the steps of placing a plurality of polyphase windings in slots of a stator core, the polyphase windings including respective coil ends exposed circumferentially of the stator core, and inserting a sheet of insulating paper between the coil ends of adjacent two of the polyphase windings to electrically insulate the coil ends from each other.

With the above arrangement, the bent portion extending and bent back radially of the stator core is inserted between adjacent two of the polyphase windings which are arranged circumferentially of the stator core. Therefore, flat webs of the bent portion are resiliently urged of their own accord to be pressed against the polyphase windings. Even when the gap between the windings varies, the flat webs are resiliently spread or contracted in association with the polyphase windings, thereby absorbing the variation in the gap. Therefore, the insulating members are reliably held in place between the windings, and prevented from being accidentally removed or displaced, for thus keeping the polyphase windings highly electrically insulated from each other.

The above and other objects, features, and advantages of the present invention will become apparent from the following description when taken in conjunction with the accompanying drawings which illustrate preferred embodiments of the present invention byway of example.

DETAILED DESCRIPTION OF THE PREFERRED EMBODIMENTS

Figure 1:
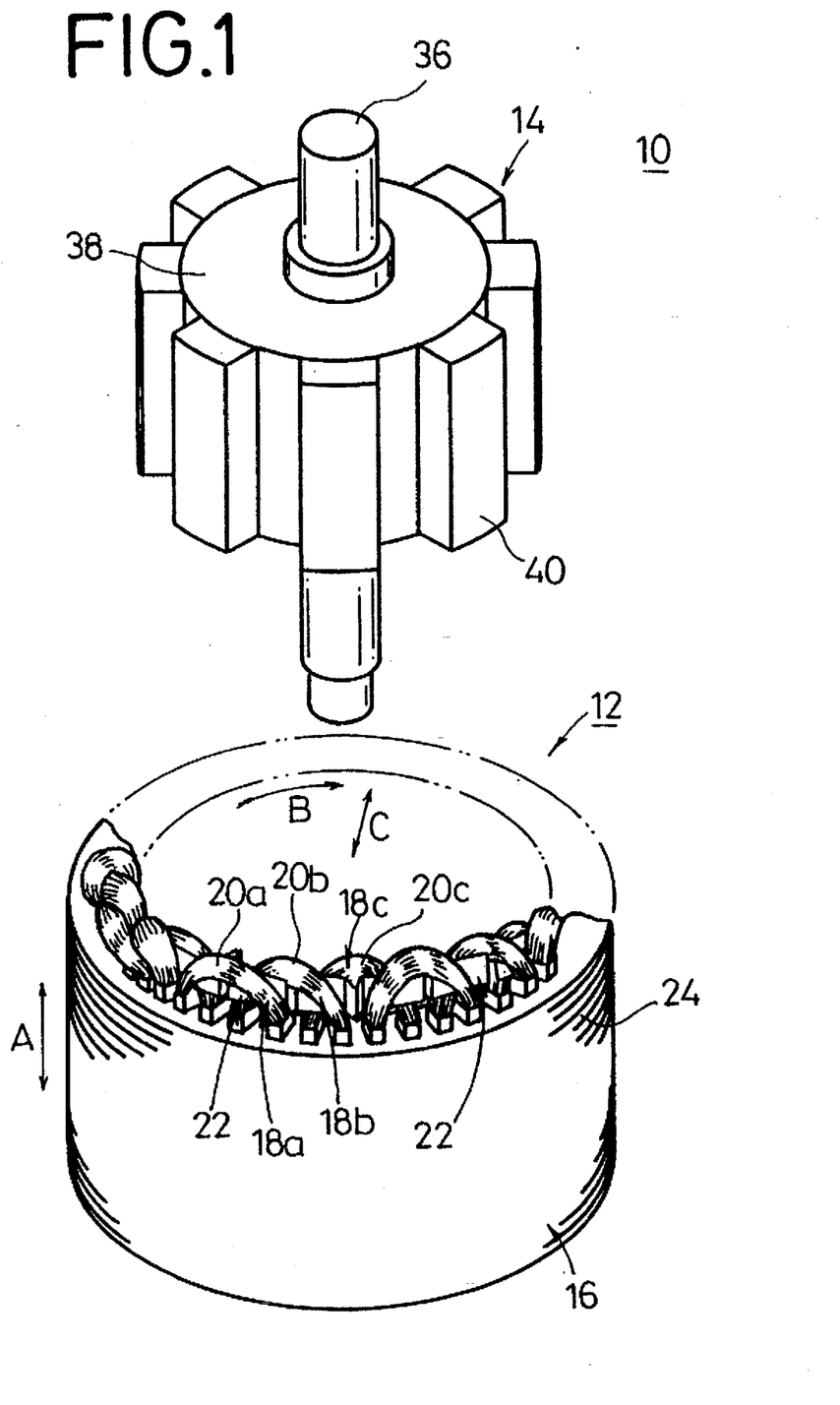
FIG. 1 is an exploded perspective view of an electric motor which incorporates a polyphase stator according to the present invention.

FIG. 1 shows an electric motor 10 having a three-phase stator (polyphase stator) 12 according to an embodiment of the present invention and a rotor 14 rotatably disposed in the three-phase stator 12.

The three-phase stator 12 comprises a stator core 16, three-phase windings (polyphase windings) 18a~18c supported in the stator core 16, and sheets of insulating paper (insulating members) 22 disposed between respective coil ends 20a~20c of the windings 18a~18c. The stator core 16 is composed of a stack of steel sheets 24 joined integrally together, and has a plurality of slots 26 defined in its inner circumferential surface at angularly spaced intervals therealong and juxtaposed in the axial direction (indicated by the arrow A) of the stator core 16. The windings 18a~18c are disposed in the slots 26. The windings 18a~18c are in the form of coils of electrically conductive wires, e.g., enameled wires, and are of a wavy configuration and inserted into the slots 26 by an insert jig (described later on).

Figure 2:
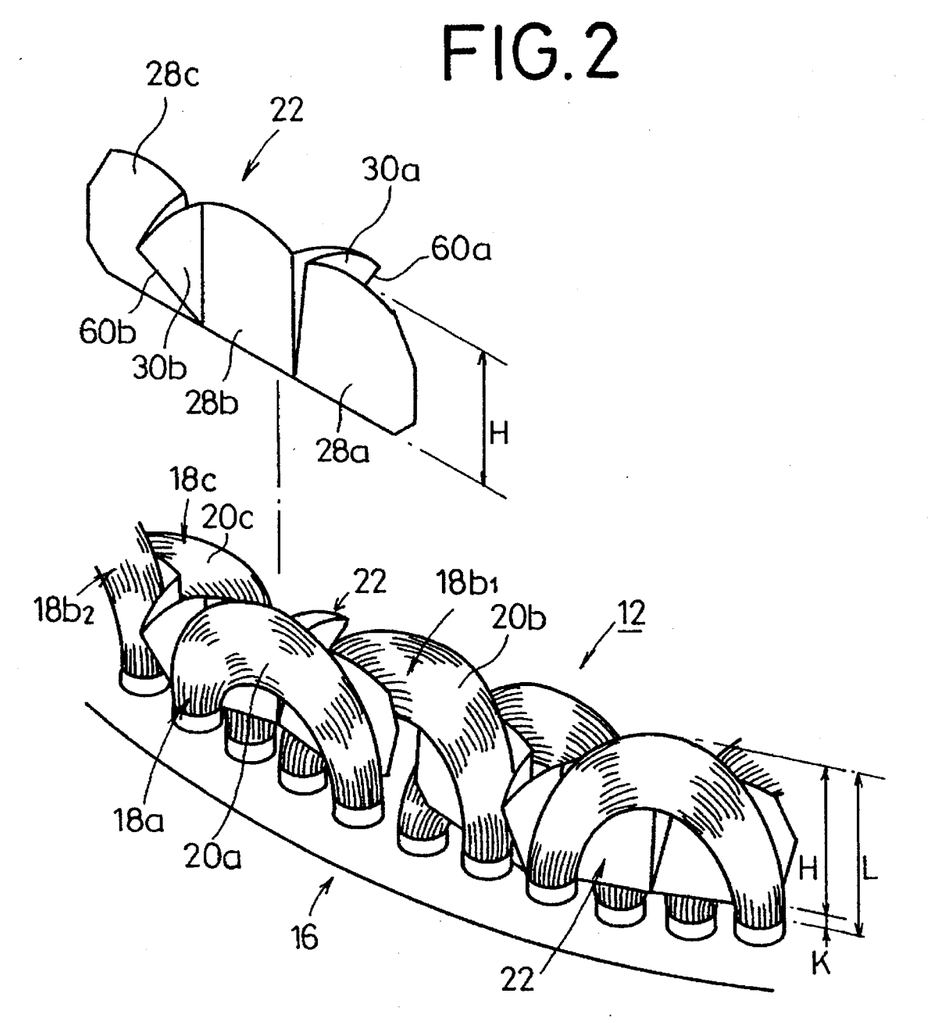
FIG. 2 is a fragmentary perspective view showing the manner in which a sheet of insulating paper is inserted into a polyphase stator according to an embodiment of the present invention.
Figure 3:
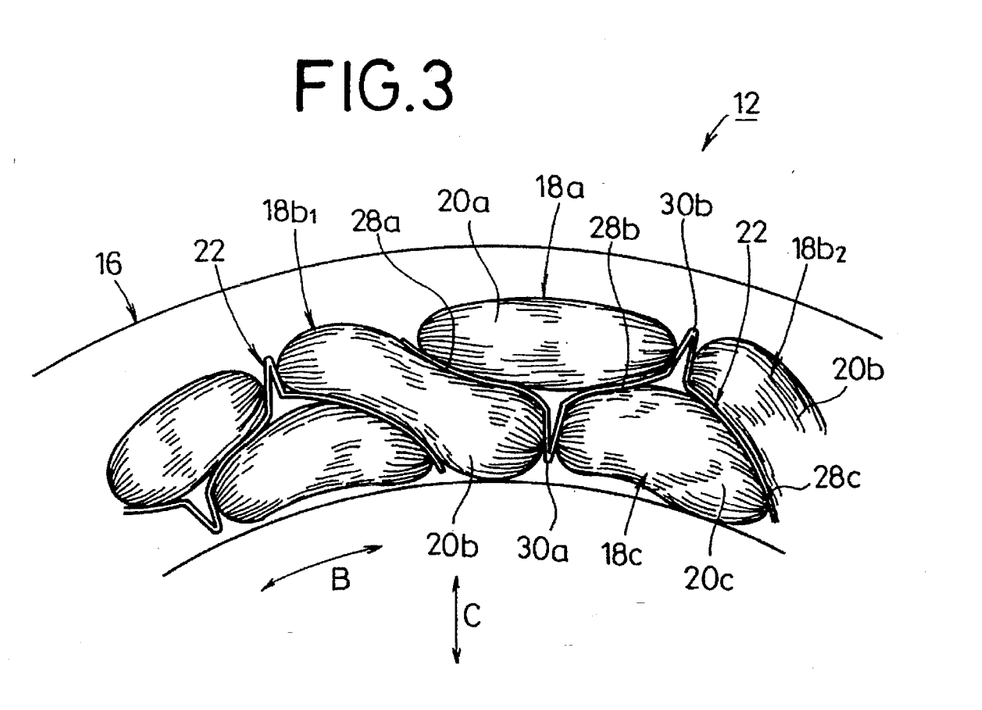
FIG. 3 is a fragmentary plan view of the polyphase stator and sheets of insulating paper inserted therein.

As shown in FIGS. 2 and 3, each of the sheets of insulating paper 22 extends circumferentially of the stator core 16 in the direction indicated by the arrow B. Each of the sheets of insulating paper 22 comprises flat portions 28a~28c inserted between windings 18a and 18b, windings 18a and 18c, and windings 18b$_2$ and 18c that are arranged radially of the stator core 16 in the direction indicated by the arrow C, and bent portions 30a, 30b extending and bent back radially of the stator core 16 and inserted between the windings $18b_1$ and $18c$ and the windings $18a$ and $18b_2$ that are arranged circumferentially of the stator core 16, the bent portions 30a, 30b being positioned between and integral with the flat portions 28a~28c.

Figure 4:
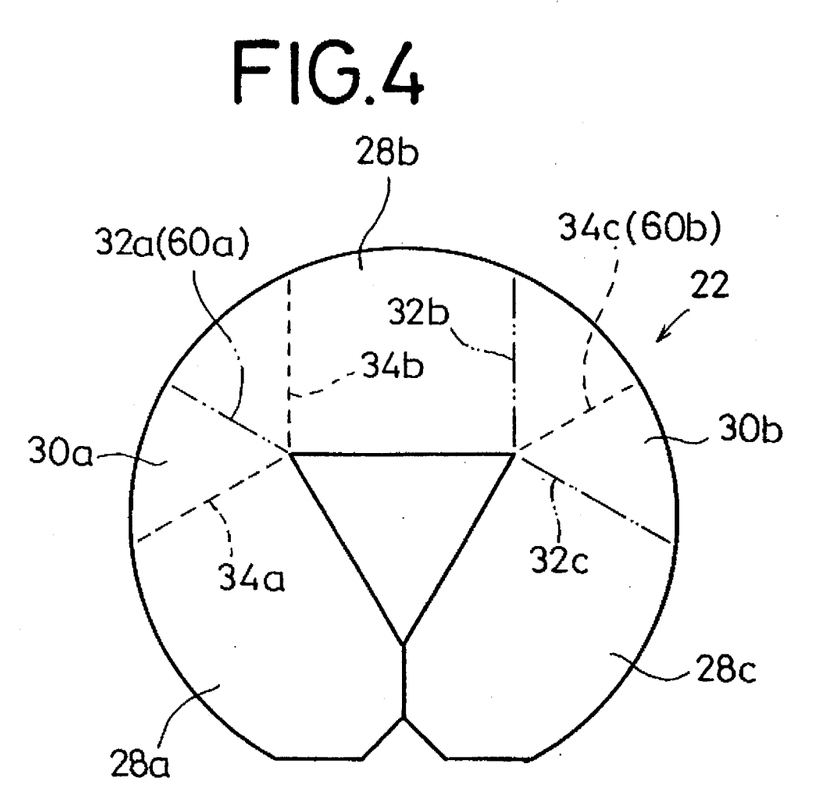
FIG. 4 is a plan view of a blank sheet of insulating paper.

More specifically, as shown in FIG. 4, each of the sheets of insulating paper 22 is formed from a substantially circular sheet of relatively hard paper having a substantially central triangular opening defined therein and cut radially outwardly from one corner of the central triangular opening toward an outer circumferential edge of the substantially circular sheet. The circular sheet of relatively hard paper also has a peak fold 32a and valley folds 34a, 34b that extend radially outwardly at angularly spaced intervals from one of the other two corners of the central triangular opening toward the outer circumferential edge of the substantially circular sheet, and peak folds 32b, 32c and a valley fold 34c that extend radially outwardly at angularly spaced intervals from the remaining corner of the central triangular opening toward the outer circumferential edge of the substantially circular sheet. The circular sheet of relatively hard paper is bent in opposite directions along the peak folds 32a~32c and the valley folds 34a~34c to form the bent portions 30a, 30b into substantially triangular shapes integral with the flat portions 28a~28c.

As shown in FIG. 2, the sheets of insulating paper 22 have a height H that is smaller than the length L of the coil ends 20a~20c from their lower insulating paper to their top outer ends, leaving a non-insulated gap K between the lower edge of the sheets of insulating paper 22 and the lower insulating paper of the coil ends 20a~20c.

As shown in FIG. 1, the rotor 14 has a shaft 36, a yoke 38 mounted on the shaft 36, and a plurality of permanent magnets 40 disposed on an outer circumferential surface of the yoke 38 at angularly spaced intervals therealong.

A process of assembling the electric motor 10 will be described below.

After the windings 18a~18c have been shaped into a wavy configuration, the windings 18a~18c are successively supported by an insert jig 50 (see FIG. 5) and placed into the slots 26 of the stator core 16 thereby. Specifically, the insert jig 50 with the winding 18a engaged by blades 52 thereof is inserted into the stator core 16, and a punch 54 is introduced axially into the insert jig 50. The winding 18a is now forced into some of the slots 26 by the punch 54 with the wavy configuration thereof being reversed.

Figure 5:
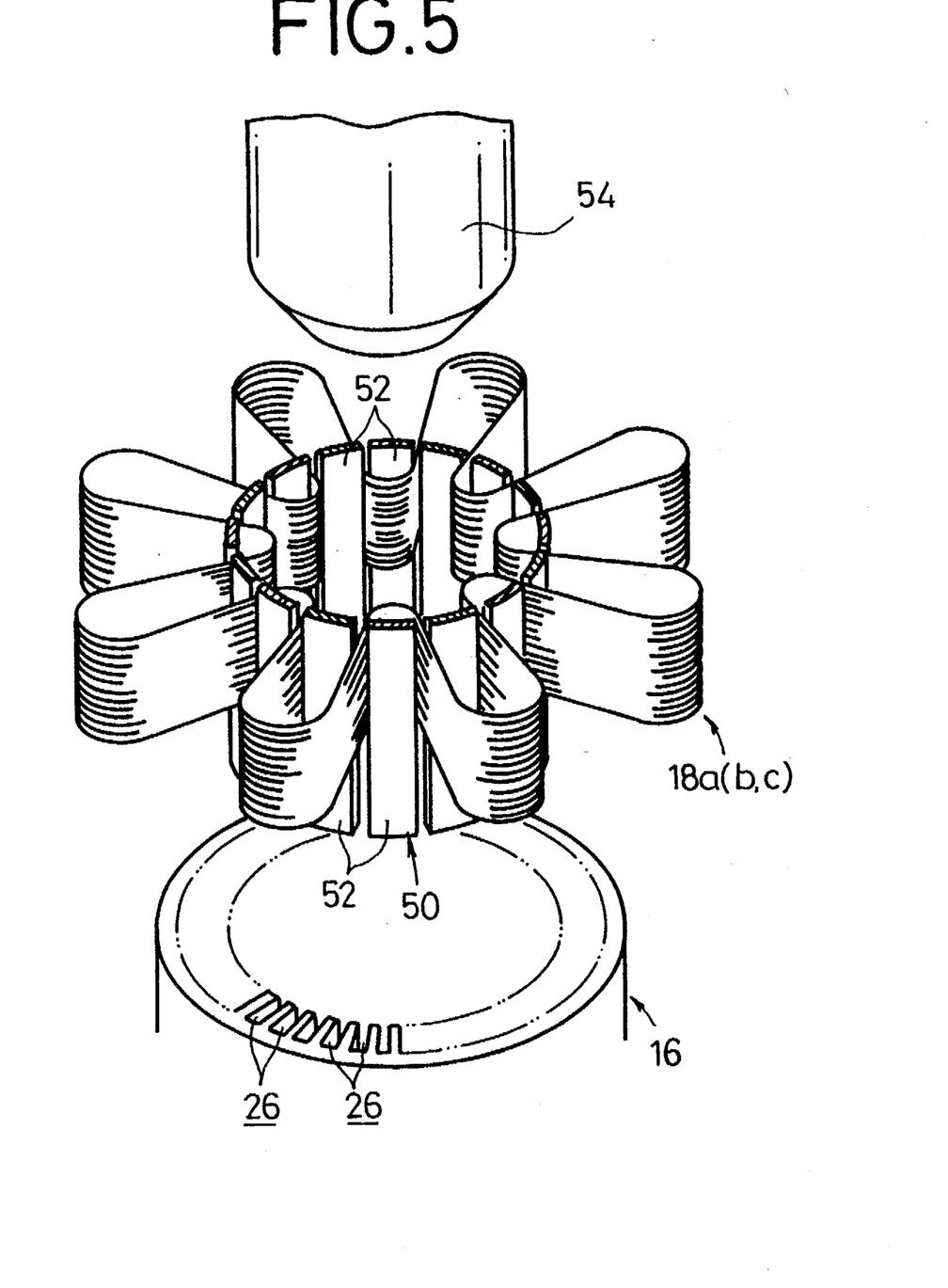
FIG. 5 is an exploded perspective view showing how windings are inserted into a stator core.

Similarly, the windings 18b, 18c are successively into corresponding slots 26 by the insert jig 50. When the windings 18a~18c have thus been placed into the stator core 16, they jointly make up the three-phase stator 12.

The sheets of insulating paper 22 are bent along the peak folds 32a~32c and the valley folds 34a~34c (see FIG. 4), and have the flat portions 28a~28c and the bent portions 30a, 30b integral therewith. As shown in FIG. 2, the bent portions 30a, 30b are of a substantially triangular shape and have respective bent edges 60a, 60b which serve as leading edges in the direction in which the sheets of insulating paper 22 are inserted between the windings 18a~18c.

Then, the flat portions 28a~28c of the sheets of insulating paper 22 are inserted between the windings 18a and $18b_1$, the windings 18a and 18c, and the windings $18b_2$ and 18c that are arranged radially of the stator core 16 in the direction indicated by the arrow C, and the bent portions 30a, 30b of the sheets of insulating paper 22 are inserted between the windings $18b_2$ and 18c and the windings 18a and $18b_2$ that are arranged circumferentially of the stator core 16 in the direction indicated by the arrow B (see FIG. 3).

In the above embodiment, the bent portions 30a, 30b which extend and are bent back radially of the stator core 16 in the direction indicated by the arrow C are inserted between the windings $18b_1$ and 18c and the windings 18a and $18b_2$ that are arranged circumferentially of the stator core 16 in the direction indicated by the arrow B. The bent portions 30a, 30b have respective pairs of flat webs that are resiliently urged of their own accord to spread away from each other about the bent edges 60a, 60b. Therefore, even when the gaps between the windings $18b_1$ and 18c and the windings 18a and $18b_2$ vary, the bent portions 30a, 30b are automatically spread or contracted under their own resiliency in association with the windings $18b_1$ and 18c and the windings 18a and $18b_2$, thus absorbing the variation in the gaps. The bent portions 30a, 30b are also effective in increasing the rigidity of the sheets of insulating paper 22, making it easy to insert the sheets of insulating paper 22 between the windings 18a~18c after they have been inserted into the slots 26.

The sheets of insulating paper 22 are of an integral structure composed of the flat portions 28a~28c extending circumferentially of the stator core 16 and the bent portions 30a, 30b extending and bent back radially of the stator core 16. Therefore, the surfaces of the flat portions 28a~28c and the bent portions 30a, 30b are widely held in intimate contact with the coil ends 20a~20c of the windings 18a~18c.

With the above arrangement, the sheets of insulating paper 22 are reliably and firmly held between the windings $18b_1$ and 18c and the windings 18a and $18b_2$ against accidental removal or displacement, thereby keeping the three-phase windings 18a~18c highly insulated from each other. The sheets of insulating paper 22 are simple in configuration as they are merely bent from flat sheets of paper, and are nevertheless highly rigid because of the bent portions 30a, 30b, so that the sheets of insulating paper 22 can be inserted easily between the coil ends 20a~20c.

Furthermore, the bent portions 30a, 30b are of a substantially triangular shape and have the respective bent edges 60a, 60b which serve as leading edges in the direction in which the sheets of insulating paper 22 are inserted between the windings 18a~18c. The bent portions 30a, 30b are inserted, with their bent edges 60a, 60b as leading edges, between the windings $18b_1$ and 18c and the windings 18a and $18b_2$. Consequently, the bent portions 30a, 30b can efficiently be inserted into place without being deformed.

Figure 6:
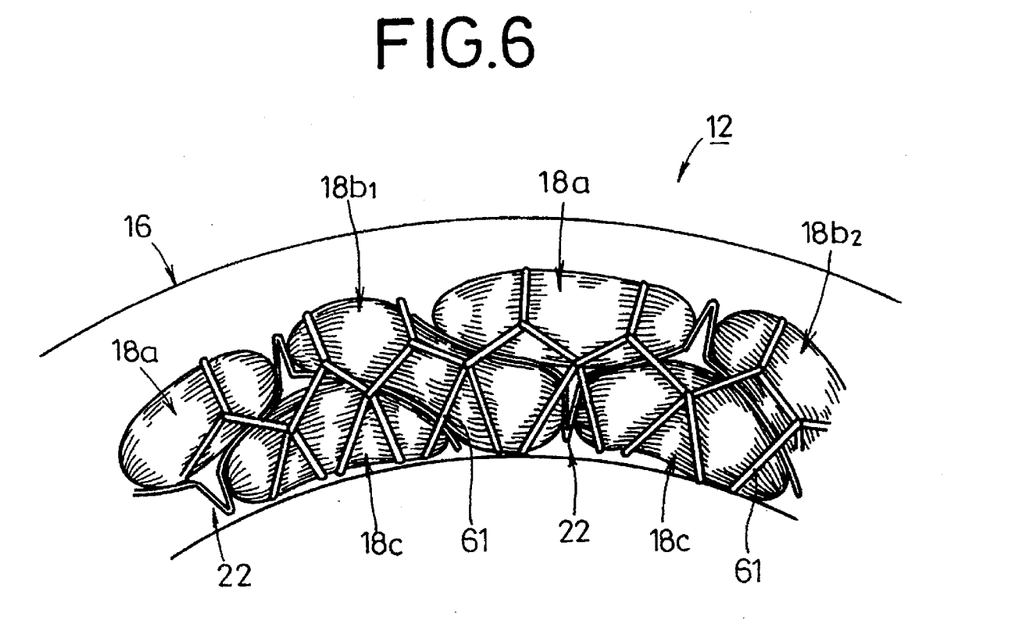
FIG. 6 is a fragmentary plan view of the polyphase stator with cords tightened on the windings.

After the sheets of insulating paper 22 have been positioned between the windings 18a~18c, the windings 18a~18c are subjected to a cord winding process. Specifically, as shown in FIG. 6, the windings 18a~18c and the sheets of insulating paper 22 are wound or tightened together by cords 61, so that the windings 18a~18c are firmly fixed in place. Since the gap K is present between the lower edge of the sheets of insulating paper 22 and the lower insulating paper of the coil ends 20a~20c, the windings 18a~18c and the sheets of insulating paper 22 can easily be wound or tightened together by the cords 61.

While the sheets of insulating paper 22 have the bent portions 30a, 30b which are substantially triangular in shape in the above embodiment, the bent portions may be of any of various other shapes, as described below.

Figure 7:
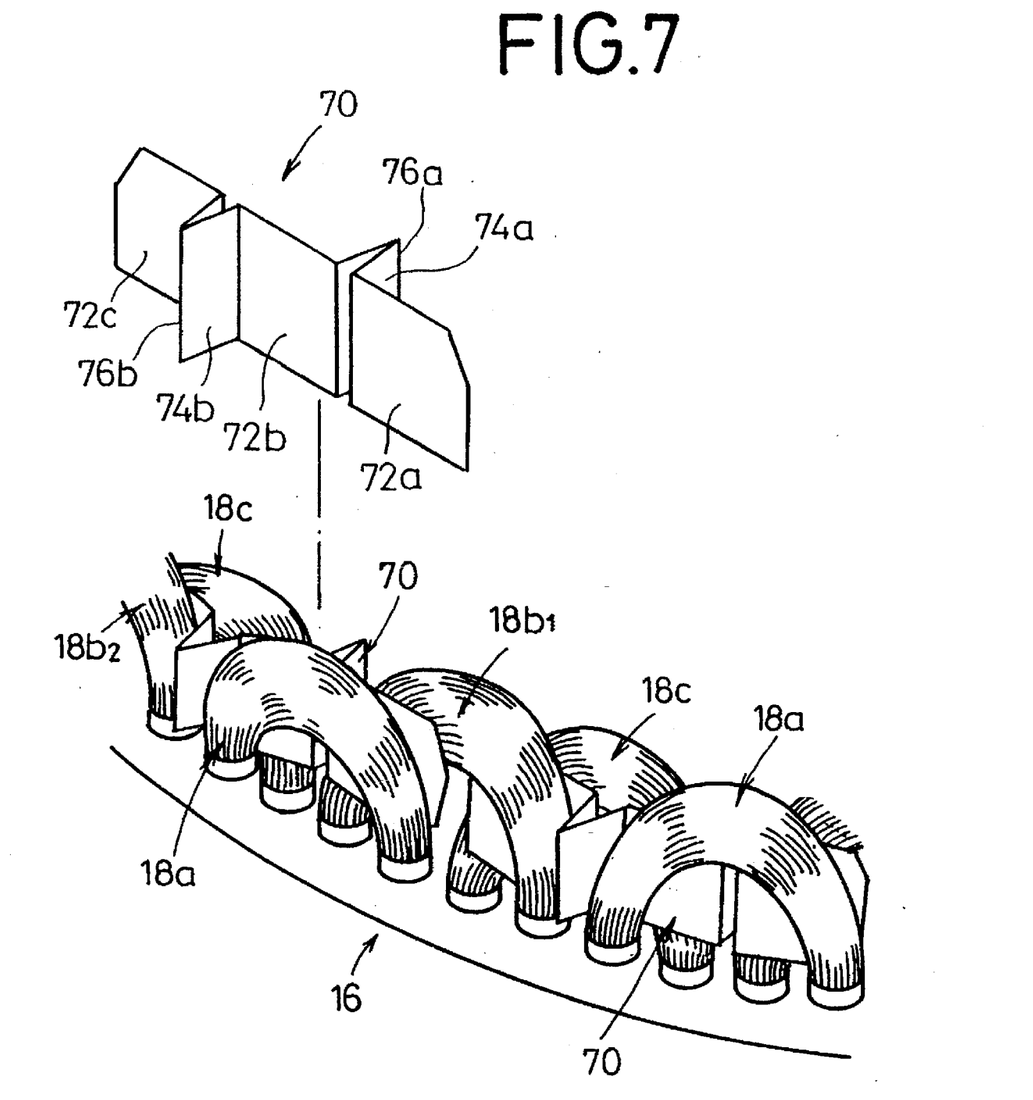
FIG. 7 is a fragmentary perspective view showing the manner in which a sheet of insulating paper is inserted into a polyphase stator according to another embodiment of the present invention.

FIG. 7 shows a sheet of insulating paper 70 according to another embodiment of the present invention.

As shown in FIG. 7, the sheet of insulating paper 70, which is bent from an elongate, substantially rectangular sheet of paper, flat portions 72a~72c inserted between windings 18a and $18b_1$, windings 18a and 18c, and windings $18b_2$ and $18c$ that are arranged radially of the stator core 16, and bent portions 74a, 74b extending and bent back radially of the stator core 16 and inserted between the windings $18b_1$ and 18c and the windings 18a and $18b_2$ that are arranged circumferentially of the stator core 16, the bent portions 74a, 74b being positioned between and integral with the flat portions 72a~72c. The bent portions 74a, 74b are spaced in the longitudinal direction of the sheet of insulating paper 70. The bent portions 74a, 74b are of a substantially rectangular shape and have respective bent edges 76a, 76b which serve as leading edges in the direction in which the sheet of insulating paper 70 is inserted between the windings 18a~18c.

The bent portions 74a, 74b have respective pairs of flat webs that are resiliently urged of their own accord to spread away from each other about the bent edges 76a, 76b. Therefore, even when the gaps between the windings $18b_1$ and 18c and the windings 18a and $18b_2$ vary, the bent portions 76a, 76b are automatically spread or contracted under their own resiliency in association with the windings $18b_1$ and 18c and the windings 18a and $18b_2$, thus absorbing the variations in the gaps. The bent portions 74a, 74b are also effective in increasing the rigidity of the sheet of insulating paper 70, making it easy to insert the sheet of insulating paper 70 between the windings 18a~18c. The sheet of insulating paper 70 is securely retained in place against accidental removal or displacement. Consequently, the sheet of insulating paper 70 offers the same advantages as those of the sheets of insulating paper 22 according to the previous embodiment.

Although certain preferred embodiments of the present invention have been shown and described in detail, it should be understood that various changes and modifications may be made therein without departing from the scope of the appended claims.

What is claimed is:

1. A polyphase stator comprising:

a stator core having slots;

polyphase windings disposed in the slots of said stator core and having respective coil ends; and insulating members disposed between the coil ends of said polyphase windings, wherein each of said insulating members has a height which is smaller than a length at which said coil ends project above said stator core;

each of said insulating members comprising:

a flat portion extending circumferentially of said stator core and inserted between at least two respective adjacent coil ends disposed at different radial positions along said stator core; and a pair of bent portions extending from said flat portion in directions substantially perpendicular to said flat portion and bent back radially of said stator core, each of said bent portions being inserted between two respective adjacent coil ends disposed at different circumferential positions along said stator core, said bent portions being integral with said flat portion, said bent portions projecting in respective opposite directions from said flat portion, said bent portions being of a substantially triangular shape and having a bent edge which serves as a leading edge in a direction in which the bent portions are inserted between said two respective adjacent coil ends disposed at different circumferential positions.

2. The polyphase stator according to claim 1, wherein said insulating member has a substantially circular shape having a substantially central triangular opening defined therein and cut radially outwardly from one corner of said central triangular opening toward an outer circumferential edge of the substantially circular shape.

3. The polyphase stator according to claim 2, wherein said insulating member has a fold extending from each of other corners of said central triangular opening toward the outer circumferential edge of the substantially circular shape, for forming said bent portion.

4. The polyphase stator according to claim 1, further comprising cords tightening said coil ends and said insulating member to each other.

5. A method of producing a stator core, comprising the steps of:

placing a plurality of polyphase windings in slots defined in a stator core, the polyphase windings including respective coil ends exposed circumferentially around said stator core; and inserting a sheet of insulating paper between the coil ends of at least two of said polyphase windings to electrically insulate the coil ends from each other, said sheet of insulating paper comprising a flat portion and a bent portion extending substantially perpendicularly to said flat portion, said flat portion being interposed between respective adjacent coil ends arranged at different radial distances along said stator core, and said flat portion being inserted between respective adjacent coil ends disposed at different circumferential positions along said stator core, said bent portion being of a substantially triangular shape and having a bent edge which serves as a leading edge in a direction in which the bent portion is inserted between said respective adjacent coil ends disposed at different circumferential positions.

6. The method according to claim 5, further comprising the step of:

after the sheet of insulating paper has been inserted between the coil ends, tightening said coil ends and said sheet of insulating paper to each other with cords.

* * * * *